US009002643B2

(12) United States Patent
Xu

(10) Patent No.: US 9,002,643 B2
(45) Date of Patent: Apr. 7, 2015

(54) POSITION INFORMATION SHARING METHOD AND POSITIONING DEVICE AND SYSTEM

(71) Applicant: Huawei Device Co., Ltd, Shenzhen (CN)

(72) Inventor: Zhongjie Xu, San Diego, CA (US)

(73) Assignee: Huawei Device Co. Ltd., Shenzhen (CN)

( * ) Notice: Subject to any disclaimer, the term of this patent is extended or adjusted under 35 U.S.C. 154(b) by 93 days.

(21) Appl. No.: 13/903,810

(22) Filed: May 28, 2013

(65) Prior Publication Data
US 2013/0253825 A1 Sep. 26, 2013

Related U.S. Application Data

(63) Continuation of application No. PCT/CN2011/076652, filed on Jun. 30, 2011.

(51) Int. Cl.
G01C 21/00 (2006.01)
H04W 4/02 (2009.01)
H04W 4/08 (2009.01)
G01S 5/00 (2006.01)
G01S 5/02 (2010.01)
(Continued)

(52) U.S. Cl.
CPC ............. G01C 21/00 (2013.01); H04W 4/023 (2013.01); H04W 4/08 (2013.01); H04W 4/206 (2013.01); G01S 5/0009 (2013.01); G01S 5/0289 (2013.01); H04L 67/18 (2013.01); H04L 61/1594 (2013.01)

(58) Field of Classification Search
CPC ........ G01C 21/00; H04W 4/023; H04W 4/08; H04W 4/206; G01S 5/009; G01S 5/0289; H04L 67/18; H04L 61/00
USPC .......... 701/468, 482, 454, 522; 455/507, 457, 455/518, 519, 524, 512, 411, 414.1, 414.2
See application file for complete search history.

(56) References Cited

U.S. PATENT DOCUMENTS 6,504,503 B1 * 1/2003 Saint-Hilaire et al. ... 342/357.25
6,718,503 B1 * 4/2004 Lerner et al. .................. 714/755
(Continued)

FOREIGN PATENT DOCUMENTS

CN 1434662 A 8/2003
CN 1948908 A 4/2007
(Continued)

OTHER PUBLICATIONS

Extended European Search Report received in Application No. 11789275.2-1870 mailed Mar. 12, 2014, 5 pages.
(Continued)

Primary Examiner — Richard Camby
(74) Attorney, Agent, or Firm — Slater & Matsil, L.L.P.

(57) ABSTRACT

Embodiments of the present invention provide a position information sharing method and a positioning device and system. The position information sharing method includes sending a position query request to a first positioning device or a positioning server. The position query request carries a first positioning device identifier. Position information of the first positioning device is received. The position information is sent by the first positioning device or the positioning server according to the position query request. The position information of the first positioning device can be displayed.

17 Claims, 5 Drawing Sheets

(51) Int. Cl.
*H04L 29/08* (2006.01)
*H04W 4/20* (2009.01)
*H04L 29/12* (2006.01)

(56) References Cited

U.S. PATENT DOCUMENTS

| | | | |
|---|---|---|---|
| 7,219,303 B2 * | 5/2007 | Fish | 715/753 |
| 2006/0223518 A1 | 10/2006 | Haney | |
| 2007/0281689 A1 | 12/2007 | Altman et al. | |
| 2010/0182193 A1 | 7/2010 | Lin et al. | |
| 2010/0262915 A1 | 10/2010 | Bocking et al. | |
| 2010/0317392 A1 | 12/2010 | Davis et al. | |

FOREIGN PATENT DOCUMENTS

| | | | |
|---|---|---|---|
| CN | 101039475 A | 9/2007 | |
| CN | 101270999 A | 9/2008 | |
| CN | 100487377 C | 5/2009 | |
| CN | 101504288 A | 8/2009 | |
| CN | 101505457 A | 8/2009 | |
| CN | 101557414 A | 10/2009 | |
| CN | 101742639 A | 6/2010 | |
| CN | 101771936 A | 7/2010 | |
| CN | 101800931 A | 8/2010 | |
| CN | 102026104 A | 4/2011 | |
| EP | 2239896 A1 | 10/2010 | |
| WO | 2007101703 A2 | 9/2007 | |

OTHER PUBLICATIONS

First Office Action of Chinese Application No. 201180001416.X mailed May 9, 2013, 36 pages. (Partial Translation).

International Search Report received in Application No. PCT/CN2011/076652, Appliant: Huawei Device Co., Ltd. et al., mailed Apr. 12, 2012, 16 pages.

* cited by examiner

POSITION INFORMATION SHARING METHOD AND POSITIONING DEVICE AND SYSTEM

CROSS-REFERENCE TO RELATED APPLICATIONS

This application is a continuation of International Application No. PCT/CN2011/076652, filed on Jun. 30, 2011, which is hereby incorporated by reference in their entireties.

TECHNICAL FIELD

Embodiments of the present invention relate to the field of communications technologies, and in particular, to a position information sharing method and a positioning device and system.

BACKGROUND

A positioning technology is a common technology in the existing field of communications.

In the prior art, a global positioning system (hereinafter referred to as GPS for short) is usually provided in positioning devices, such as some mobile terminals and vehicle mounted navigators. The GPS can receive geosynchronous satellite signals, so as to position a mobile terminal. In the prior art, an acceleration transducer or an angular velocity transducer may also be provided in a positioning device such as a mobile terminal or a vehicle mounted navigator, so as to provide information such as the direction of motion, the speed, and the acceleration of the positioning device in a reference system where the positioning device is located, so as to record, through an inertial navigation technology, a movement path of a device using a positioning system.

In a process of implementing the present invention, the inventor finds that the prior art at least has the following problem. An existing positioning device can merely position itself, but cannot implement position information sharing with other positioning devices. For example, when a positioning device intends to learn information such as positions and paths of other positioning devices, the positioning device has no way of learning such information.

SUMMARY OF THE INVENTION

Embodiments of the present invention provide a position information sharing method and a positioning device and system, so as to solve the defect that position information sharing between positioning devices cannot be implemented in the prior art.

An embodiment of the present invention provides a position information sharing method, which includes sending a position query request to a first positioning device or a positioning server. The position query request carries a first positioning device identifier and the first positioning device identifier is an identifier of the first positioning device. Position information of the first positioning device is received. The position information is sent by the first positioning device or the positioning server according to the position query request. The position information of the first positioning device can then be displayed.

An embodiment of the present invention provides a position information sharing method, which includes receiving position information of a first positioning device, which is sent by the first positioning device in a first positioning group or a positioning server. The first positioning group includes a current positioning device and the first positioning device. The position information of the first positioning device is displayed.

An embodiment of the present invention provides a position information sharing method, which includes receiving position information of a first positioning device sent by the first positioning device. The position information of the first positioning device is sent to a second positioning device, so that the second positioning device displays the position information of the first positioning device.

An embodiment of the present invention provides a positioning device, which includes a sending module, configured to send a position query request to a first positioning device or a positioning server. The position query request carries a first positioning device identifier and the first positioning device identifier is an identifier of the first positioning device. A receiving module is configured to receive position information of the first positioning device, which is sent by the first positioning device or the positioning server according to the position query request. A display module is configured to display the position information of the first positioning device.

An embodiment of the present invention provides a positioning device, which includes a receiving module, configured to receive position information of a first positioning device. The position information is sent by the first positioning device in a first positioning group or a positioning server. The first positioning group includes a current positioning device and the first positioning device. A display module is configured to display the position information of the first positioning device in the first positioning group.

An embodiment of the present invention provides a positioning server, which includes a receiving module that is configured to receive position information of a first positioning device sent by the first positioning device and a sending module that is configured to send the position information of the first positioning device to a second positioning device. The second positioning device displays the position information of the first positioning device.

An embodiment of the present invention provides a positioning system, which includes a first positioning device and a second positioning device. The first positioning device and the second positioning device are in communication connection with each other. The first positioning device is configured to send a position query request to the second positioning device. The second positioning device is configured to receive the position query request and to send position information of the second positioning device to the first positioning device according to the position query request. The first positioning device is further configured to receive the position information of the second positioning device and to display the position information of the second positioning device.

An embodiment of the present invention further provides a positioning system, which includes a first positioning device, a second positioning device and a positioning server. The first positioning device and the second positioning device are both in communication connection with the positioning server. The first positioning device is configured to send a position query request to the positioning server. The position query request carries a second positioning device identifier and the second positioning device identifier is an identifier of the second positioning device. The positioning server is configured to receive the position query request sent by the first positioning device and to send the position query request to the second positioning device. The second positioning device is configured to receive the position query request sent by the positioning server and to send position information of the second positioning device to the positioning server. The positioning server is further configured to receive the position information of the second positioning device sent by the second positioning device and to send the position information of the second positioning device to the first positioning device. The first positioning device is further configured to receive the position information of the second positioning device sent by the positioning server and to display the position information of the second positioning device.

An embodiment of the present invention further provides a positioning system, which includes a first positioning device and a second positioning device. The first positioning device and the second positioning device are in communication connection with each other. The first positioning device and the second positioning device belong to the same positioning group. The first positioning device is configured to send position information of the first positioning device to the second positioning device in the positioning group. The second positioning device is configured to receive the position information of the first positioning device, which is sent by the first positioning device in the positioning group and to display the position information of the first positioning device.

An embodiment of the present invention further provides a positioning system, which includes a first positioning device, a second positioning device and a positioning server. The first positioning device and the second positioning device are both in communication connection with the positioning server and the first positioning device and the second positioning device belong to the same positioning group. The first positioning device is configured to send position information of the first positioning device to the positioning server. The positioning server is configured to receive the position information of the first positioning device that is sent by the first positioning device in the positioning group and to send the position information of the first positioning device to the second positioning device. The second positioning device is configured to receive the position information of the first positioning device in the positioning group sent by the positioning server and to display the position information of the first positioning device.

In the position information sharing method and the positioning device and system according to the embodiments of the present invention, by adopting the technical solutions described above, position information sharing between positioning devices can be implemented, thereby providing an effective solution for position information sharing between positioning devices.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

Figure 1:
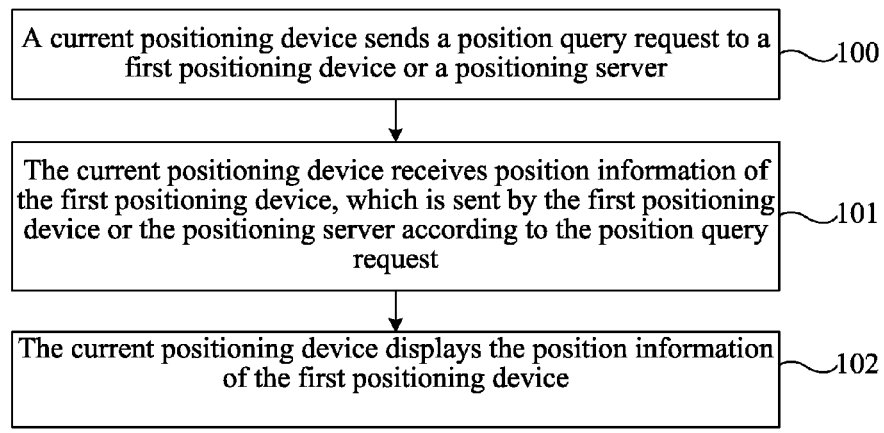
FIG. 1 is a flow chart of a position information sharing method provided by an embodiment of the present invention.

FIG. 1 is a flow chart of a position information sharing method provided by Embodiment 1 of the present invention. As shown in FIG. 1, an execution body of the position information sharing method in this embodiment is a positioning device, which can be referred to as a current positioning device. The position information sharing method in this embodiment may specifically include the following steps.

100: The current positioning device sends a position query request to a first positioning device or a positioning server.

The position query request carries a first positioning device identifier, and the first positioning device identifier is an identifier of the first positioning device.

101: The current positioning device receives position information of the first positioning device, which is sent by the first positioning device or the positioning server according to the position query request.

102: The current positioning device displays the position information of the first positioning device.

The current positioning device in this embodiment may be a terminal having a positioning function, for example, a cell phone provided with positioning software or a GPS terminal.

The technical solution of this embodiment includes two schemes. In a case, the current positioning device directly communicates with the first positioning device. In a second case, the current positioning device communicates with the first positioning device through the positioning server. For the second case, the current positioning device may send a position query request to the first positioning device through the positioning server, and then, the positioning server forwards the position query request to the first positioning device. Then, the first positioning device sends the position information of the first positioning device to the positioning server according to the position query request, and the positioning server forwards the position information of the first positioning device to the current positioning device. Therefore, the current positioning device receives the position information of the first positioning device, which is reported by the first positioning device according to the position query request and is forwarded by the positioning server. Or, the positioning server may receive and store the position information of the first positioning device in advance, the current positioning device sends the position query request to the positioning server, and then, the positioning server sends the stored position information of the first positioning device to the current positioning device.

In the position information sharing method of this embodiment, the current positioning device sends the position query request to the first positioning device or the positioning server, and then, the current positioning device receives the position information of the first positioning device, which is sent by the first positioning device or the positioning server according to the position query request, and the current positioning device displays the position information of the first positioning device. By adopting the technical solutions of this embodiment, position information sharing between positioning devices can be implemented, thereby providing an effective solution for position information sharing between positioning devices.

Optionally, in the position information sharing method of the embodiment, the position information of the first positioning device includes current position information of the first positioning device and/or historical position information of the first positioning device.

Optionally, in the position information sharing method of the embodiment, an identifier of the current positioning device may also be carried in the position query request. In this way, after receiving the position query request, the positioning server can learn that the position query request is a request for querying the position information of the first positioning device by the current positioning device.

Figure 2:
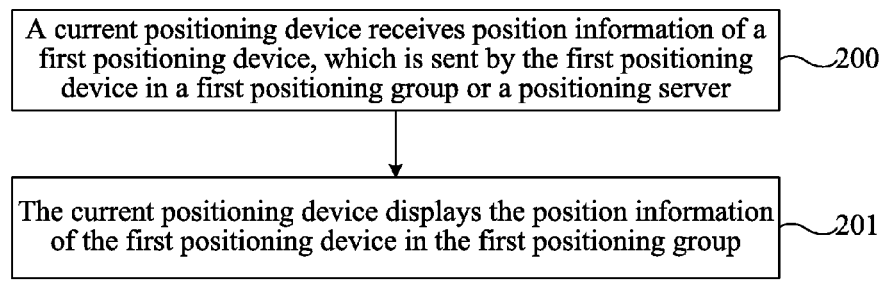
FIG. 2 is a flow chart of a position information sharing method provided by another embodiment of the present invention.

FIG. 2 is a flow chart of a position information sharing method provided by another embodiment of the present invention. As shown in FIG. 2, an execution body of the position information sharing method in this embodiment is a positioning device, which can be referred to as a current positioning device. The position information sharing method in this embodiment may specifically include the following steps.

200: The current positioning device receives position information of a first positioning device, which is sent by the first positioning device in a first positioning group or a positioning server.

The first positioning group includes the current positioning device and the first positioning device.

201: The current positioning device displays the position information of the first positioning device in the first positioning group.

The current positioning device in this embodiment may be a terminal having a positioning function, for example, a cell phone provided with positioning software or a GPS terminal.

Two technical solutions are also included in this embodiment. In a case, the current positioning device directly receives the position information sent by the first positioning device in the first positioning group. In another case, the current positioning device receives the position information of the first positioning device in the first positioning group, which is sent by the positioning server. For the second case, the positioning server may first receive the position information of the first positioning device sent by the first positioning device, and then send the position information of the first positioning device to the current positioning device. It can also be understood as that the positioning server forwards the position information of the first positioning device to the current positioning device.

In the position information sharing method of this embodiment, the current positioning device receives the position information of the first positioning device, which is sent by the first positioning device in the first positioning group; and displays the position information of the first positioning device in the first positioning group. By adopting the technical solutions of this embodiment, position information sharing between positioning devices can be implemented, thereby providing an effective solution for position information sharing between positioning devices.

Optionally, in the position information sharing method of the embodiment shown in FIG. 2, the position information of the first positioning device includes current position information of the first positioning device and/or historical position information of the first positioning device.

Optionally, the position information sharing method of the embodiment shown in FIG. 2 is illustrated by taking the current positioning device and the first positioning device as an example. In actual application, when the first positioning group includes multiple positioning devices, the current positioning device may also receive and display position information of all positioning devices in the first positioning group. In a case where too many positioning devices exist in the first positioning group, it may also be set that the current positioning device only receives and displays position information of a part of the positioning devices in the first positioning group, so as to achieve the purpose of saving power or decreasing the number of devices displayed on a screen.

Figure 3:
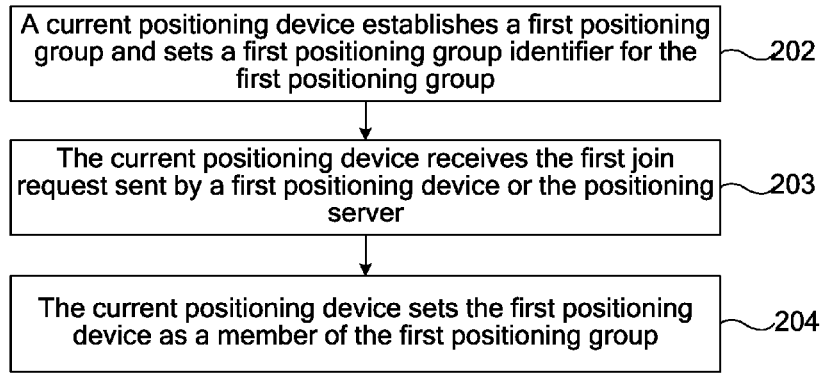
FIG. 3 is a flow chart of a position information sharing method provided by yet another embodiment of the present invention.

FIG. 3 is a flow chart of a position information sharing method provided by yet another embodiment of the present invention. As shown in FIG. 3, based on the embodiment shown in FIG. 2, before 200, the position information sharing method in this embodiment may further include the following steps.

202: The current positioning device establishes the first positioning group and sets a first positioning group identifier for the first positioning group.

Optionally, the current positioning device may send a request for establishing the first positioning group to the positioning server. After the first positioning group is established, the positioning server returns the first positioning group identifier to the current positioning device.

203: The current positioning device receives a first join request sent by a first positioning device or the positioning server.

The first join request carries the first positioning group identifier and an identifier of the first positioning device.

In this step, the current positioning device may directly receive the first join request sent by the first positioning device. It may also be possible that the first positioning device first sends the first join request to the positioning server, and the positioning server sends the first join request to the current positioning device.

204: The current positioning device sets the first positioning device as a member of the first positioning group.

For example, in specific implementation, a file may be set for the first positioning group in the current positioning device or the positioning server. An identifier of each member positioning device in the first positioning group is stored in the file, so as to identify each member positioning device included in the first positioning group. Different rights of the members may also be set in the file. For example, the current positioning device has the right of deleting another positioning device from the first positioning group, so as to manage the first positioning group.

Based on the embodiment shown in FIG. 2, in the position information sharing method of this embodiment, it is taken as an example that the current positioning device establishes the first positioning group. In actual application, it may also be possible that another positioning device in the first positioning group establishes the positioning group, for example, the first positioning device establishes the first positioning group.

In this embodiment, after the first positioning group is established, the positioning device that establishes the first positioning group may broadcast the first positioning group identifier, or may not broadcast the first positioning group identifier. When another positioning device intends to join the first positioning group, the positioning device searches for the first positioning group identifier and sends a join request to the positioning device that establishes or manages the first positioning group, so that the positioning device that establishes or manages the first positioning group sets the first positioning device as a member of the first positioning group.

Optionally, in this embodiment, after the current positioning device establishes the first positioning group in 202 and before the current positioning device receives the first join request sent by the first positioning device or the positioning server in 203, the method may further include: sending, by the current positioning device, a first invite information, which carries the first positioning group identifier, to the first positioning device or the positioning server, so as to invite the first positioning device to join the first positioning group.

When the current positioning device sends the first invite message, which carries the first positioning group identifier, to the positioning server, the positioning server sends the first invite message to the first positioning device, and the first positioning device determines whether to join the first positioning group.

For example, an address book may be set in the current positioning device, and information about a positioning device of a friend of a user of the current positioning device, for example, an identifier of a positioning device of a friend, may be stored in the address book. In this embodiment, the first positioning device may be a positioning device of a friend of the user of the current positioning device. In this way, the current positioning device may obtain the identifier of the first positioning device according to the address book, and sends an invite message, which carries the first positioning group identifier, to the first positioning device or the positioning server, so that the first positioning device joins the first positioning group. For example, when the current positioning device is a cell phone, all phone numbers of friends stored in the cell phone are phone numbers of friends of a user of the current cell phone. The current cell phone may send an invite message to a phone number of each friend through an address book in the cell phone, so that a cell phone corresponding to the friend joins the first positioning group established by the current cell phone.

Optionally, in this embodiment, the first positioning group identifier may be mapped to a form that may be identified and memorized by a user, for example, a number, an email mailbox address, or a special character. When the current positioning device does not send an invite message to the first positioning device, the first positioning device may also search the positioning server and requests joining the first positioning group.

In the position information sharing method in this embodiment, the first positioning group is established, and a positioning device member is set for the first positioning group, so that position information sharing between positioning devices in the first positioning group can be subsequently implemented with the first positioning group as a unit, thereby providing an effective solution for position information sharing between positioning devices.

Optionally, in the technical solution of the embodiment, after the first positioning group is established, a rule may be set for the first positioning group, which requires the positioning device members in the first positioning group to periodically report position information to each other. The positioning devices may also periodically report their respective position information to the positioning server, and then, the positioning server sends the position information to the positioning devices. Through 200 and 201 in the embodiment shown in FIG. 2, position information sharing between the positioning devices in the first positioning group may be implemented.

Optionally, in the first positioning group, the positioning devices may not periodically report position information to each other, and when a certain positioning device intends to acquire position information of another positioning device, the positioning device sends a position query request, which carries an identifier of the another positioning device, to the another positioning device or the positioning server, so as to obtain the position information of the another positioning device. For example, before 200 of the embodiment, the method further includes: sending, by the current positioning device, a first position query request, which carries a first positioning device identifier, to the first positioning device in the first positioning group or the positioning server.

When the current positioning device sends the first position query request, which carries the first positioning device identifier, to the positioning server, the positioning server sends the first position query request to the first positioning device. When the first positioning device agrees to report a current position, the first positioning device sends the position information of the first positioning device to the positioning server, and the positioning server sends the position information of the first positioning device to the current positioning device.

Optionally, the current positioning device may send the first position query request to the positioning server, and an identifier of another positioning device whose position information is requested to be obtained may be specified in the first position query request. If an identifier of a positioning device whose position information is requested to be obtained is not specified, it is regarded by default that position information of all other positioning devices in the first positioning group is requested to be queried.

Optionally, when receiving the first position query request sent by the current positioning device or the positioning server, another positioning device may choose whether to send the position information or not in response to the query request.

Optionally, if the another positioning device chooses not to send updated position information or the another positioning device cannot send the updated position information due to reasons such as a network interrupt and power-off of the positioning device, various prompt information may be displayed on the current positioning device. For example, a positioning device whose position information cannot be obtained is displayed as gray, or a prompt is provided through warning tones.

Figure 4:
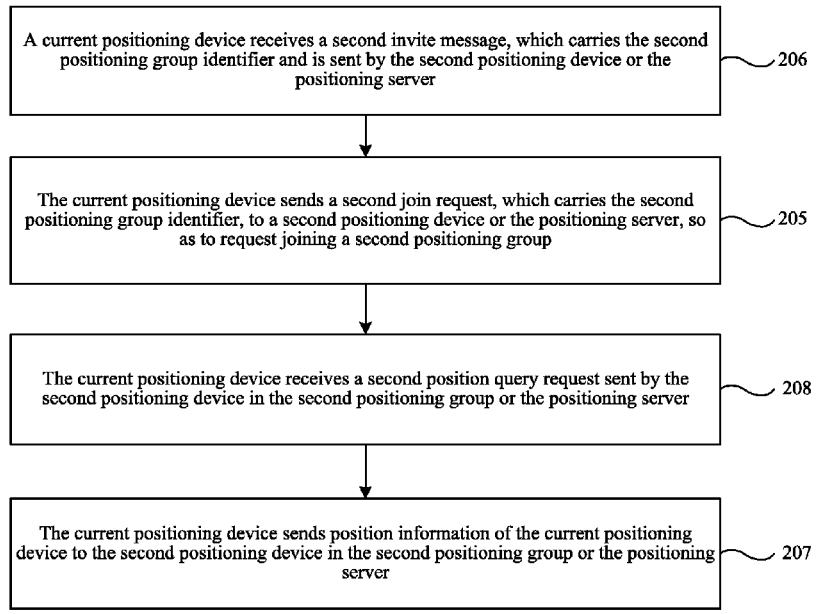
FIG. 4 is a flow chart of a position information sharing method provided by still another embodiment of the present invention.

FIG. 4 is a flow chart of a position information sharing method provided by still another embodiment of the present invention. As shown in FIG. 4, based on the embodiment shown in FIG. 2, after 201, the position information sharing method in this embodiment may further include the following.

205: The current positioning device sends a second join request, which carries a second positioning group identifier, to a second positioning device or the positioning server, so as to request joining a second positioning group.

The second positioning group is a positioning group corresponding to the second positioning group identifier.

In this embodiment, the second positioning group is managed by the second positioning device or the positioning server.

Optionally, before 205, the method may further include the following:

206: The current positioning device receives a second invite message, which carries the second positioning group identifier and is sent by the second positioning device or the positioning server.

When each positioning device in the second positioning group periodically report its respective position information, at this time, after 205, the method further includes the following.

207: The current positioning device sends position information of the current positioning device to the second positioning device in the second positioning group or the positioning server.

Optionally, an identifier of the current positioning device may be carried in the position information of the current positioning device. The current positioning device sends the position information of the current positioning device to the second positioning device in the second positioning group, so that the second positioning device directly displays the position information of the current positioning device. After the current positioning device sends the position information of the current positioning device to the positioning server, the positioning server stores the position information of the current device. When another positioning device in the second positioning group requests the position information of the current positioning device from the positioning server, the current positioning server sends the position information of the current positioning device to the another positioning device.

When the positioning devices in the second positioning group do not periodically report their respective position information but send the position information under the trigger of receiving a position query request, at this time, after step 205 and before step 207, the method may include the following.

208: The current positioning device receives a second position query request sent by the second positioning device in the second positioning group or the positioning server.

The second position query request carries a second positioning device identifier, and the second positioning device identifier is an identifier of the second positioning device. Optionally, a current positioning device identifier may also be carried in the second position query request. In this way, when the second positioning device sends the second position query request to the positioning server, the positioning server can learn that the second positioning device requests querying the position information of the current positioning device. At this time, if the positioning server has stored the position information of the current positioning device, the positioning server may directly return the position information of the current positioning device to the second positioning device. If the positioning server does not store the position information of the current positioning device, the positioning server sends the second position query request to the current positioning device. Correspondingly, the current positioning device receives the second position query request sent by the positioning server.

In the position information sharing method of this embodiment, by adopting the technical solution described above, position information sharing between the positioning devices in the second positioning group can be implemented, thereby providing an effective solution for position information sharing between positioning devices.

Figure 5:
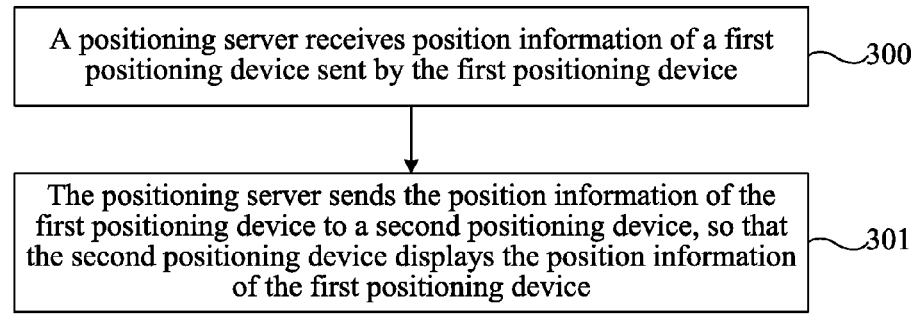
FIG. 5 is a flow chart of a position information sharing method provided by further another embodiment of the present invention.

FIG. 5 is a flow chart of a position information sharing method provided by further another embodiment of the present invention. As shown in FIG. 5, an execution body of the position information sharing method in this embodiment is a positioning server. The position information sharing method in this embodiment may include the following steps.

300: The positioning server receives position information of a first positioning device sent by the first positioning device.

301: The positioning server sends the position information of the first positioning device to a second positioning device, so that the second positioning device displays the position information of the first positioning device.

In the position information sharing method of this embodiment, the positioning server receives the position information of the first positioning device sent by the first positioning device, and sends the position information of the first positioning device to the second positioning device, so that the second positioning device displays the position information of the first positioning device. Position information sharing between the first positioning device and the second positioning device can be implemented, thereby providing an effective solution for position information sharing between positioning devices.

Optionally, before 300 in the embodiment, the method may further include the following.

(1): The positioning server receives a position query request, which carries a first positioning device identifier and is sent by the second positioning device.

(2): The positioning server sends the position query request, which carries the first positioning device identifier, to the first positioning device.

Optionally, in combination with description of the embodiments shown in FIG. 2 to FIG. 4, the first positioning device and the second positioning device in this embodiment belong to the same positioning group, for example, to the first positioning group or the second positioning group.

In this way, the position information sharing method in this embodiment may further include receiving, by the positioning server, a first join request sent by the first positioning device, so as to set the first positioning device as a member of the positioning group; and receiving, by the positioning server, a second join request sent by the second positioning device, so as to set the second positioning device as a member of the positioning group, where the two steps may not be in a specific sequence.

The first join request may carry a first positioning device identifier and a positioning group identifier. The second joint request may carry a second positioning device identifier and a positioning group identifier. The first positioning device identifier is an identifier of the first positioning device, and the second positioning device identifier is an identifier of the second positioning device.

The first positioning device and the second positioning device may search the positioning server and find the positioning group, and then initiate join requests.

Or, before the receiving, by the positioning server, the first join request sent by the first positioning device and receiving, by the positioning server, the second join request sent by the second positioning device, the method may further include: sending, by the positioning server, a first invite message to the first positioning device, so as to invite the first positioning device to join the positioning group; and sending, by the positioning server, a second invite message to the second positioning device, so as to invite the second positioning device to join the positioning group, where the two steps may not be in a specific sequence.

The positioning group may be established by the positioning server or other positioning devices than the first positioning device and the second positioning device in the positioning group.

Persons of ordinary skill in the art may understand that all or part of the steps of the methods of the embodiments may be implemented by a program instructing relevant hardware. The program may be stored in a computer readable storage medium. When the program is run, the foregoing steps of the methods of the embodiments are performed. The storage medium may be any medium capable of storing program codes, such as ROM, RAM, magnetic disk, or optical disk.

Figure 6:
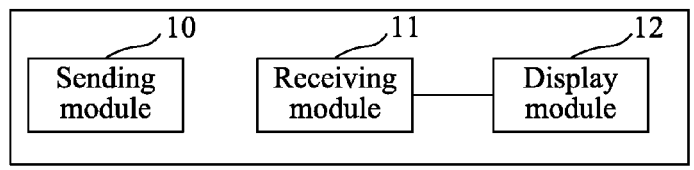
FIG. 6 is a schematic structural diagram of a positioning device provided by an embodiment of the present invention.

FIG. 6 is a schematic structural diagram of a positioning device provided by an embodiment of the present invention. As shown in FIG. 6, the positioning device in this embodiment may include: a sending module 10, a receiving module 11 and a display module 12.

The sending module 10 is configured to send a position query request to a first positioning device or a positioning server, where the position query request carries a first positioning device identifier, and the first positioning device identifier is an identifier of the first positioning device. The receiving module 11 is configured to receive position information of the first positioning device, which is sent by the first positioning device or the positioning server according to the position query request sent by the sending module 10. The display module 12 is connected to the receiving module 11, and the display module 12 is configured to display the position information of the first positioning device received by the receiving module 11.

In the positioning device of this embodiment, a method for implementing position information sharing by adopting the modules is the same as the implementation manner of the relevant method embodiment, and for details, reference can be made to the description of the relevant embodiment, and the details are not described herein again.

In the positioning device of this embodiment, by adopting the modules, the current positioning device sends the position query request to the first positioning device or the positioning server, and then the current positioning device receives the position information of the first positioning device, which is sent by the first positioning device or the positioning server according to the position query request, and the current positioning device displays the position information of the first positioning device. By adopting the technical solution of this embodiment, position information sharing between positioning devices can be implemented, thereby providing an effective solution for position information sharing between positioning devices.

Optionally, in the position information sharing method of the embodiment, the position information of the first positioning device includes current position information of the first positioning device and/or historical position information of the first positioning device.

Figure 7:
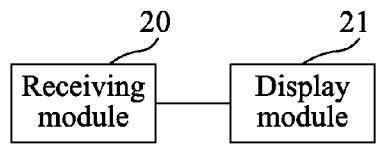
FIG. 7 is a schematic structural diagram of a positioning device provided by another embodiment of the present invention.

FIG. 7 is a schematic structural diagram of a positioning device provided by another embodiment of the present invention. As shown in FIG. 7, the positioning device in this embodiment may include: a receiving module 20 and a display module 21.

The receiving module 20 is configured to receive position information of a first positioning device, which is sent by the first positioning device in a first positioning group or a positioning server, where the first positioning group includes a current positioning device and the first positioning device. The display module 21 is connected to the receiving module 20, and the display module 21 is configured to display the position information of the first positioning device in the first positioning group, where the position information of the first positioning device in the first positioning group is received by the receiving module 20.

In the positioning device of this embodiment, a method for implementing position information sharing by adopting the modules is the same as the implementation manner of the relevant method embodiment, and for details, reference can be made to the description of the relevant embodiment, and the details are not described herein again.

In the positioning device of this embodiment, by adopting the modules, the current positioning device receives the position information of the first positioning device, which is sent by the first positioning device in the first positioning group; and displays the position information of the first positioning device in the first positioning group. By adopting the technical solution of this embodiment, position information sharing between positioning devices can be implemented, thereby providing an effective solution for position information sharing between positioning devices.

Figure 8:
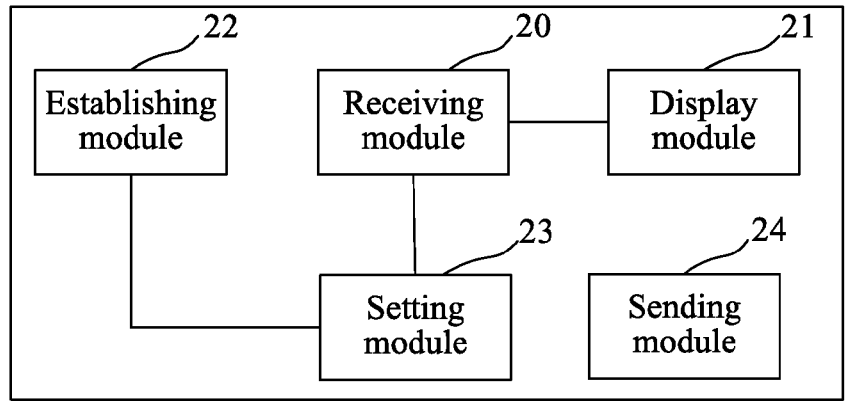
FIG. 8 is a schematic structural diagram of a positioning device provided by yet another embodiment of the present invention.

FIG. 8 is a schematic structural diagram of a positioning device provided by yet another embodiment of the present invention. As shown in FIG. 8, based on the embodiment shown in FIG. 7, the positioning device in this embodiment may further include an establishing module 22 and a setting module 23.

The establishing module 22 is configured to establish a first positioning group, and set a first positioning group identifier for the first positioning group. The receiving module 20 is configured to receive a first join request sent by the first positioning device or the positioning server, where the first join request carries the first positioning group identifier and an identifier of the first positioning device. The setting module 23 is connected to the establishing module 22 and the receiving module 20. The setting module 23 is configured to set the first positioning device corresponding to the first join request received by the receiving module 20 as a member of the first positioning group established by the establishing module 22.

Optionally, the positioning device in this embodiment further includes a sending module 24. The sending module 24 is configured to send a first invite message, which carries the first positioning group identifier, to the first positioning device or the positioning server, so as to invite the first positioning device to join the first positioning group.

Optionally, the sending module 24 in the positioning device in this embodiment is further configured to send a first position query request to the first positioning device in the first positioning group or the positioning server, where the first position query request carries a first positioning device identifier.

Optionally, the sending module 24 in the positioning device in this embodiment is further configured to send a second join request, which carries a second positioning group identifier, to a second positioning device or the positioning server, so as to request joining a second positioning group, where the second positioning group is a positioning group corresponding to the second positioning group identifier.

Optionally, the receiving module 20 in the positioning device in this embodiment is further configured to receive a second invite message, which carries the second positioning group identifier and is sent by the second positioning device or the positioning server.

Optionally, the sending module 24 in the positioning device in this embodiment is further configured to send position information of the current positioning device to the second positioning device in the second positioning group or the positioning server.

Optionally, the receiving module 20 in the positioning device in this embodiment is further configured to receive a second position query request sent by the second positioning device in the second positioning group or the positioning server, where the second position query request carries a second positioning device identifier, and the second positioning device identifier is an identifier of the second positioning device.

It should be noted that, in the embodiment shown in FIG. 8, the technical solutions of the present invention are explained in detail through an example that several optional schemes coexist in the positioning device of the embodiment. In actual application, one of the several optional schemes in the positioning device of the embodiment may be selected and exist in one embodiment.

In the positioning device of this embodiment, a method for implementing position information sharing by adopting the modules is the same as the implementation manner of the relevant method embodiment, and for details, reference can be made to the description of the relevant embodiment, and the details are not described herein again.

In the positioning device of this embodiment, by adopting the modules, the first positioning group is established, a positioning device member is set for the first positioning group, and position information sharing between positioning devices is implemented with the first positioning group as a unit, thereby providing an effective solution for position information sharing between positioning devices.

Figure 9:
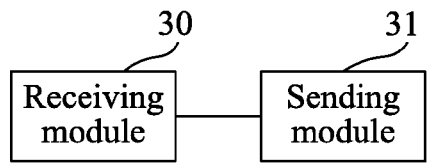
FIG. 9 is a schematic structural diagram of a positioning server provided by an embodiment of the present invention.

FIG. 9 is a schematic structural diagram of a positioning server provided by an embodiment of the present invention. As shown in FIG. 9, the positioning server in this embodiment may specifically include: a receiving module 30 and a sending module 31.

The receiving module 30 is configured to receive position information of a first positioning device sent by the first positioning device. The sending module 31 is connected to the receiving module 30, and the sending module 31 is configured to send the position information of the first positioning device received by the receiving module 30 to a second positioning device, so that the second positioning device displays the position information of the first positioning device.

In the positioning server of this embodiment, a method for implementing position information sharing by adopting the modules is the same as the implementation manner of the relevant method embodiment, and for details, reference can be made to the description of the relevant embodiment, and the details are not described herein again.

In the positioning server of this embodiment, by adopting the modules, the positioning server receives the position information of the first positioning device sent by the first positioning device and sends the position information of the first positioning device to the second positioning device, so that the second positioning device displays the position information of the first positioning device. Position information sharing between the first positioning device and the second positioning device can be implemented, thereby providing an effective solution for position information sharing between positioning devices.

Optionally, in the positioning server of the embodiment, the receiving module 30 is further configured to receive a position query request, which carries a first positioning device identifier and is sent by the second positioning device. The sending module 31 is further configured to send the position query request, which carries the first positioning device identifier and is received by the receiving module 30, to the first positioning device.

Optionally, in the positioning server of the embodiment, the first positioning device and the second positioning device belong to the same positioning group.

Further, optionally, in the positioning server of the embodiment, the receiving module 30 is further configured to receive a first join request sent by the first positioning device, so as to set the first positioning device as a member of the positioning group. The receiving module 30 is further configured to receive a second join request sent by the second positioning device, so as to set the second positioning device as a member of the positioning group.

Further, optionally, in the positioning server of the embodiment, the sending module 31 is further configured to send a first invite message to the first positioning device, so as to invite the first positioning device to join the positioning group. The sending module 31 is further configured to send a second invite message to the second positioning device, so as to invite the second positioning device to join the positioning group.

In the positioning server of this embodiment, a method for implementing position information sharing by adopting the modules is the same as the implementation manner of the relevant method embodiment, and for details, reference can be made to the description of the relevant embodiment, and the details are not described herein again.

In the positioning server of this embodiment, position information sharing between the first positioning device and the second positioning device can be implemented by adopting the modules, thereby providing an effective solution for position information sharing between positioning devices.

Figure 10:
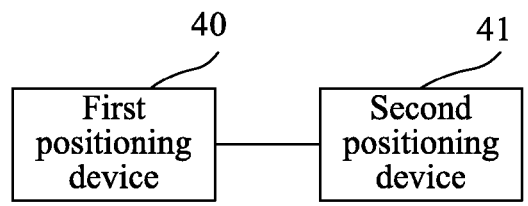
FIG. 10 is a schematic structural diagram of a positioning system provided by an embodiment of the present invention.

FIG. 10 is a schematic structural diagram of a positioning system provided by an embodiment of the present invention. As shown in FIG. 10, the positioning system in this embodiment may include a first positioning device 40 and a second positioning device 41. The first positioning device 40 and the second positioning device 41 are in communication connection with each other.

The first positioning device 40 is configured to send a position query request to the second positioning device 41. The second positioning device 41 is configured to receive the position query request and send position information of the second positioning device 41 to the first positioning device 40 according to the position query request. The first positioning device 40 is configured to receive the position information of the second positioning device 41, and display the position information of the second positioning device 41.

It should be noted that, a method for the positioning system of this embodiment to implement position information sharing by adopting the first positioning device 40 and the second positioning device 41 is the same as the implementation manner of the relevant method or apparatus embodiment. For example, the method for the positioning system of this embodiment to implement position information sharing by adopting the first positioning device 40 and the second positioning device 41 is the same as the implementation manner of a part of the method embodiment shown in FIG. 1 and the implementation manner of a part of the apparatus embodiment shown in FIG. 6, and for details, reference can be made to the description of the relevant embodiment, and the details are not described herein again.

It should be noted that the positioning system including the first positioning device 40 and the second positioning device 41 is taken as an example for illustration in this embodiment. In actual application, the positioning devices included in the positioning system are not limited to the first positioning device 40 and the second positioning device 41, and other positioning devices may be included. As for a manner of implementing position information sharing between any two positioning devices, reference can be made to the description of the embodiment.

In the positioning system of this embodiment, by adopting the technical solution described above, position information sharing between the first positioning device and the second positioning device can be implemented, thereby providing an effective solution for position information sharing between positioning devices.

Figure 11:
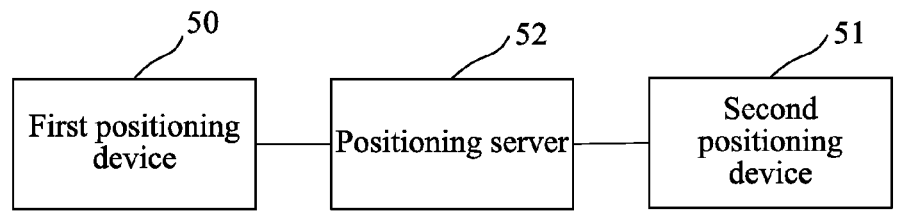
FIG. 11 is a schematic structural diagram of a positioning system provided by another embodiment of the present invention.

FIG. 11 is a schematic structural diagram of a positioning system provided by another embodiment of the present invention. As shown in FIG. 11, the positioning system in this embodiment may include a first positioning device 50, a second positioning device 51 and a positioning server 52. The first positioning device 50 and the second positioning device 51 are both in communication connection with the positioning server 52.

The first positioning device 50 is configured to send a position query request to the positioning server 52, where the position query request carries a second positioning device identifier, and the second positioning device identifier is an identifier of the second positioning device 51. The positioning server 52 is configured to receive the position query request sent by the first positioning device 50, and send the position query request to the second positioning device 51. The second positioning device 51 is configured to receive the position query request sent by the positioning server 52, and send position information of the second positioning device 51 to the positioning server 52. The positioning server 52 is further configured to receive the position information of the second positioning device 51 sent by the second positioning device 51, and send the position information of the second positioning device 51 to the first positioning device 50. The first positioning device 50 is further configured to receive the position information of the second positioning device 51 sent by the positioning server 52, and display the position information of the second positioning device 51.

It should be noted that, a method for the positioning system of this embodiment to implement position information sharing by adopting the first positioning device 50, the second positioning device 51 and the positioning server 52 is the same as the implementation manner of the relevant method or apparatus embodiment. For example, the method for the positioning system of this embodiment to implement position information sharing by adopting the first positioning device 50, the second positioning device 51 and the positioning server 52 is the same as the implementation manner of a part of the method embodiment shown in FIG. 1 and the implementation manner of a part of the apparatus embodiments shown in FIG. 6 and FIG. 9, and for details, reference can be made to the description of the relevant embodiment, and the details are not described herein again.

It should be noted that the positioning system including the first positioning device 50 and the second positioning device 51 is taken as an example for illustration in this embodiment. In actual application, the positioning devices included in the positioning system are not limited to the first positioning device 50 and the second positioning device 51, and other positioning devices may be included. As for a manner of implementing position information sharing between any two positioning devices, reference can be made to the description of the embodiment.

In the positioning system of this embodiment, by adopting the technical solution described above, position information sharing between the first positioning device and the second positioning device can be implemented, thereby providing an effective solution for position information sharing between positioning devices.

Figure 12:
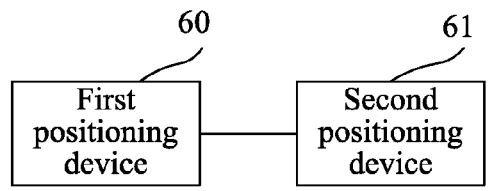
FIG. 12 is a schematic structural diagram of a positioning system provided by yet another embodiment of the present invention.

FIG. 12 is a schematic structural diagram of a positioning system provided by yet another embodiment of the present invention. As shown in FIG. 12, the positioning system in this embodiment may include a first positioning device 60 and a second positioning device 61. The first positioning device 60 and the second positioning device 61 are in communication connection with each other, and the first positioning device 60 and the second positioning device 61 belong to the same positioning group.

The first positioning device 60 is configured to send position information of the first positioning device 60 to the second positioning device 61 in the positioning group. The second positioning device 61 is configured to receive the position information of the first positioning device 60 sent by the first positioning device 60 in the positioning group, and display the position information of the first positioning device 60.

It should be noted that, a method for the positioning system of this embodiment to implement position information sharing by adopting the first positioning device 60 and the second positioning device 61 is the same as the implementation manner of the relevant method or apparatus embodiment. For example, the method for the positioning system of this embodiment to implement position information sharing by adopting the first positioning device 60 and the second positioning device 61 is the same as the implementation manner of a part of the method embodiment shown in FIG. 2 and the implementation manner of a part of the apparatus embodiment shown in FIG. 7, and for details, reference can be made to the description of the relevant embodiment, and the details are not described herein again.

It should be noted that the positioning system including the first positioning device 60 and the second positioning device 61 is taken as an example for illustration in this embodiment. In actual application, the positioning devices included in the positioning system are not limited to the first positioning device 60 and the second positioning device 61, and other positioning devices may be included. As for a manner of implementing position information sharing between any two positioning devices, reference can be made to the description of the embodiment.

In the positioning system of this embodiment, by adopting the technical solution described above, position information sharing between the first positioning device and the second positioning device can be implemented, thereby providing an effective solution for position information sharing between positioning devices.

Figure 13:
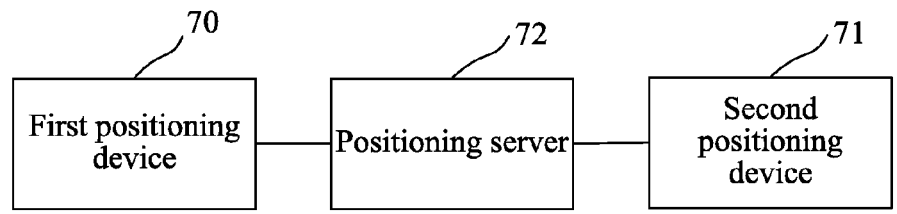
FIG. 13 is a schematic structural diagram of a positioning system provided by still another embodiment of the present invention.

FIG. 13 is a schematic structural diagram of a positioning system provided by still another embodiment of the present invention. As shown in FIG. 13, the positioning system in this embodiment may include a first positioning device 70, a second positioning device 71 and a positioning server 72. The first positioning device 70 and the second positioning device 71 are both in communication connection with the positioning server 72, and the first positioning device 70 and the second positioning device 71 belong to the same positioning group.

The first positioning device 70 is configured to send position information of the first positioning device 70 to the positioning server 72. The positioning server 72 is configured to receive the position information of the first positioning device 70 sent by the first positioning device 70 in the positioning group, and send the position information of the first positioning device 70 to the second positioning device 71. The second positioning device 71 is configured to receive the position information of the first positioning device 70 in the positioning group, which is sent by the positioning server 72; and display the position information of the first positioning device 70.

It should be noted that, a method for the positioning system of this embodiment to implement position information sharing by adopting the first positioning device 70, the second positioning device 71 and the positioning server 72 is the same as the implementation manner of the relevant method or apparatus embodiment. For example, the method for the positioning system of this embodiment to implement position information sharing by adopting the first positioning device 70, the second positioning device 71 and the positioning server 72 is the same as the implementation manner of a part of the method embodiment shown in FIG. 2 and the implementation manner of a part of the apparatus embodiment shown in FIG. 7, and for details, reference can be made to the description of the relevant embodiment, and the details are not described herein again.

It should be noted that the positioning system including the first positioning device 70 and the second positioning device 71 is taken as an example for illustration in this embodiment. In actual application, the positioning devices included in the positioning system are not limited to the first positioning device 70 and the second positioning device 71, and other positioning devices may be included. As for a manner of implementing position information sharing between any two positioning devices, reference can be made to the description of the embodiment.

In the positioning system of this embodiment, by adopting the technical solution described above, position information sharing between the first positioning device and the second positioning device can be implemented, thereby providing an effective solution for position information sharing between positioning devices.

The foregoing described apparatus embodiments are merely exemplary. The units described as separate parts may or may not be physically separated, and parts displayed as units may or may not be physical units, may be located in one position, or may be distributed on at least two network elements. A part of or all of the modules may be selected according to the actual needs to achieve the objectives of the solutions of the embodiments. Persons of ordinary skill in the art may understand and implement the present invention without creative efforts.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solution described in the foregoing embodiments or make equivalent replacements to some technical features thereof; without departing from the idea and scope of the technical solutions of the embodiments of the present invention.

What is claimed is:

1. A position information sharing method, comprising:
setting, by a current positioning device, a first positioning device as a member of a first positioning group in response to a first join request from the first positioning device and such that the first positioning group comprises the current positioning device and the first positioning device;
receiving position information of the first positioning device, which is sent by the first positioning device in the first positioning group or a positioning server; and
displaying the position information of the first positioning device in the first positioning group.

2. The method according to claim 1, further comprising:
establishing the first positioning group;
setting a first positioning group identifier for the first positioning group; and
receiving the first join request at the current positioning device from the first positioning device or the positioning server, wherein the first join request carries the first positioning group identifier and an identifier of the first positioning device.

3. The method according to claim 2, wherein, after establishing the first positioning group and setting the first positioning group identifier and before the receiving the first join request, the method further comprises:
sending a first invite message, which carries the first positioning group identifier, to the first positioning device or the positioning server, so as to invite the first positioning device to join the first positioning group.

4. The method according to claim 1, wherein before the receiving the position information, the method further comprises:
sending a first position query request to the first positioning device in the first positioning group or the positioning server, wherein the first position query request carries a first positioning device identifier.

5. The method according to claim 1, further comprising:
sending a second join request, which carries a second positioning group identifier, to a second positioning device or the positioning server, so as to request joining a second positioning group, wherein the second positioning group is a positioning group corresponding to the second positioning group identifier.

6. The method according to claim 5, wherein before the sending the second join request, the method further comprises:
receiving a second invite message, which carries the second positioning group identifier and is sent by the second positioning device or the positioning server.

7. The method according to claim 5, further comprising:
sending position information of the current positioning device to the second positioning device in the second positioning group or the positioning server.

8. The method according to claim 7, wherein before sending the position information of the current positioning device to the second positioning device in the second positioning group or the positioning server, the method further comprises:
receiving a second position query request sent by the second positioning device in the second positioning group or the positioning server, wherein the second position query request carries a second positioning device identifier and wherein the second positioning device identifier is an identifier of the second positioning device.

9. A positioning device, comprising:
a processor;
a nontransitory computer readable medium connected to the processor and having stored thereon instructions for causing the processor to:
set a first positioning device as a member of a first positioning group in response to a first join request from the first positioning device and such that the first positioning group comprises the positioning device and the first positioning device;
receive position information of the first positioning device, which is sent by the first positioning device in the first positioning group or a positioning server; and
display the position information of the first positioning device in the first positioning group.

10. The positioning device according to claim 9, wherein the nontransitory computer readable medium further has stored thereon instructions for causing the processor to:
establish the first positioning group and to set a first positioning group identifier for the first positioning group; and
receive the first join request from the first positioning device or the positioning server, wherein the first join request carries the first positioning group identifier and an identifier of the first positioning device.

11. The positioning device according to claim 10, the nontransitory computer readable medium further has stored thereon instructions for causing the processor to send a first invite message, which carries the first positioning group identifier, to the first positioning device or the positioning server, so as to invite the first positioning device to join the first positioning group.

12. The positioning device according to claim 11, wherein the nontransitory computer readable medium further has stored thereon instructions for causing the processor to send a first position query request to the first positioning device in the first positioning group or the positioning server, wherein the first position query request carries a first positioning device identifier.

13. The positioning device according to claim 11, wherein the nontransitory computer readable medium further has stored thereon instructions for causing the processor to send a second join request, which carries a second positioning group identifier, to a second positioning device or the positioning server, so as to request joining a second positioning group, wherein the second positioning group is a positioning group corresponding to the second positioning group identifier.

14. The positioning device according to claim 13, wherein the nontransitory computer readable medium further has stored thereon instructions for causing the processor to receive a second invite message, which carries the second positioning group identifier and is sent by the second positioning device or the positioning server.

15. The positioning device according to claim 13, wherein the nontransitory computer readable medium further has stored thereon instructions for causing the processor to send position information of the positioning device to the second positioning device in the second positioning group or the positioning server.

16. The positioning device according to claim 15, wherein the nontransitory computer readable medium further has stored thereon instructions for causing the processor to receive a second position query request sent by the second positioning device in the second positioning group or the positioning server, wherein the second position query request carries a second positioning device identifier and wherein the second positioning device identifier is an identifier of the second positioning device.

17. A positioning system, comprising:
a first positioning device; and
a second positioning device;
wherein the first positioning device and the second positioning device are in communication connection with each other;
wherein the first positioning device is configured to send a position query request to the second positioning device;
wherein the second positioning device is configured to receive the position query request and to send position information of the second positioning device to the first positioning device according to the position query request; and
wherein the first positioning device is further configured to receive the position information of the second positioning device and to display the position information of the second positioning device.

* * * * *